US011960770B2

(12) United States Patent
Corbetta et al.

(10) Patent No.: US 11,960,770 B2
(45) Date of Patent: Apr. 16, 2024

(54) ACCESS REQUEST MANAGEMENT USING SUB-COMMANDS

(71) Applicant: Micron Technology, Inc., Boise, ID (US)

(72) Inventors: Simone Corbetta, Lecco (IT); Antonino Caprì, Bergamo (IT); Emanuele Confalonieri, Segrate (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/895,041

(22) Filed: Aug. 24, 2022

(65) Prior Publication Data

US 2023/0062130 A1 Mar. 2, 2023

Related U.S. Application Data

(60) Provisional application No. 63/237,331, filed on Aug. 26, 2021.

(51) Int. Cl.
*G06F 3/06* (2006.01)
(52) U.S. Cl.
CPC .......... *G06F 3/0659* (2013.01); *G06F 3/0619* (2013.01); *G06F 3/0622* (2013.01); *G06F 3/0683* (2013.01)

(58) Field of Classification Search
USPC ........................................................ 711/154
See application file for complete search history.

(56) References Cited

U.S. PATENT DOCUMENTS

| 8,775,687 | B1 * | 7/2014 | Liu ....................... G06F 3/0613 |
| | | | 710/5 |
| 9,286,208 | B2 | 3/2016 | Ide |
| 9,996,285 | B2 | 6/2018 | Kang et al. |
| 2013/0024460 | A1 * | 1/2013 | Peterson ................. G06F 3/064 |
| | | | 707/E17.049 |
| 2013/0159603 | A1 * | 6/2013 | Whitney ............ G06F 12/0246 |
| | | | 711/E12.001 |
| 2014/0052906 | A1 | 2/2014 | Thyagarajan et al. |
| 2018/0284990 | A1 * | 10/2018 | Kachare ................ G06F 3/0635 |
| 2021/0255810 | A1 | 8/2021 | Yeon et al. |
| 2022/0237077 | A1 | 7/2022 | Brewer et al. |

* cited by examiner

*Primary Examiner* — Than Nguyen
(74) *Attorney, Agent, or Firm* — Brooks, Cameron & Huebsch, PLLC

(57) ABSTRACT

Systems, apparatuses, and methods related to access request management using sub-commands. Access requests received from a host system can be managed using a respective set of sub-commands corresponding to each access request and whose status can be tracked. Tracking how far access requests are processed at a fine granularity (of sub-commands) can provide efficient management of the access requests that can reduce a gap latency in processing multiple access requests.

21 Claims, 5 Drawing Sheets

ACCESS REQUEST MANAGEMENT USING SUB-COMMANDS

PRIORITY INFORMATION

This application claims the benefit of U.S. Provisional Application No. 63/237,331, filed on Aug. 26, 2021, the contents of which are incorporated herein by reference.

TECHNICAL FIELD

The present disclosure relates generally to semiconductor memory and methods, and more particularly, to apparatuses, systems, and methods for access request management using sub-commands.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (ReRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
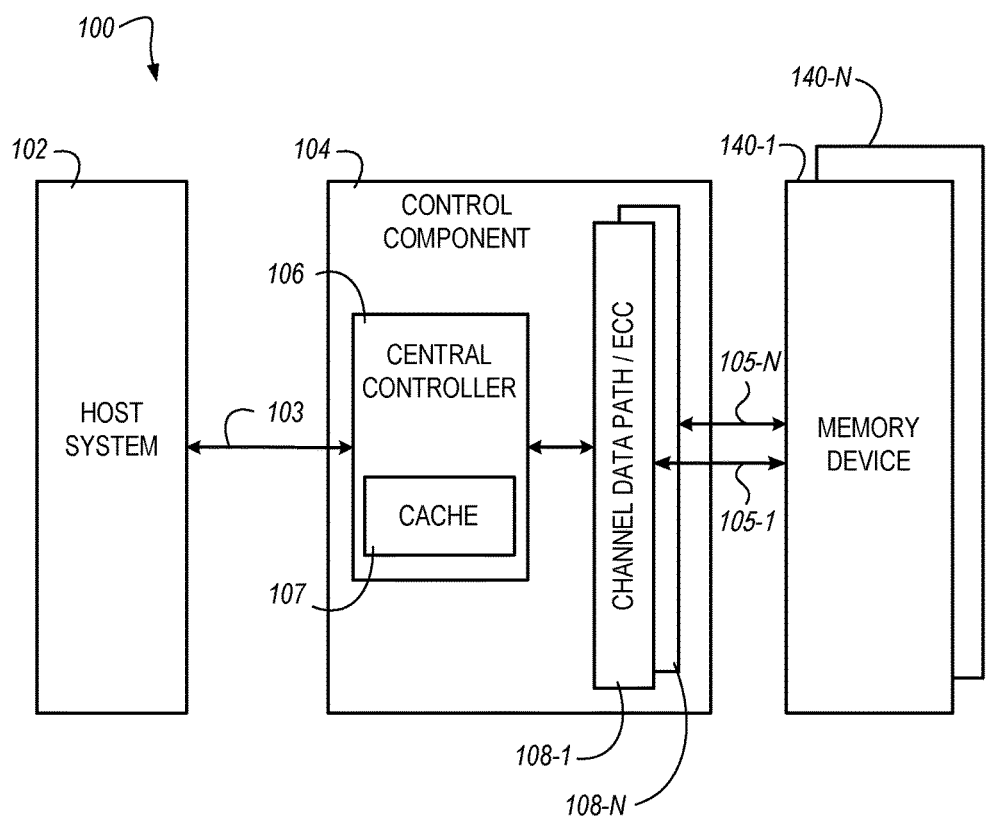
FIG. 1 is a block diagram in the form of a computing system including a host, a control component, and memory devices in accordance with a number of embodiments of the present disclosure.

Systems, apparatuses, and methods related to access request management using sub-commands. A number of embodiments of the present disclosure can provide improved/effective control of execution of access requests (e.g., read and/or write requests received from the host) as compared to previous approaches. Often, access requests received from a host system can be asynchronous as they can involve accessing different quantities of memory devices and/or performance of operations with different degrees of complexity. For example, some access requests may further involve a trigger of data protection and recovery schemes, such as a "Redundant Array of Independent Disks" (RAID) scheme, which allow data recovery of the damaged chip by reading at least constituent portions of the memory system. Such a RAID scheme may involve utilizing different components and/or data paths of the memory system, which can make access requests involving the RAID scheme more complex and asynchronous with other access requests that do not involve the RAID scheme. In some circumstances, a lack of fine control over asynchronous access requests can incur a substantial gap latency in executing consecutive access requests, which can substantially limit a quantity of access requests that a memory system can handle at a time and/or during a certain period of time. The access request management that eliminates/reduces the gap latencies therefore is desired but challenging.

Accordingly, embodiments described herein are directed to providing an access request management scheme that avoids/reduces latencies that can occur from a lack of fine control over various/different types of access requests. The embodiments of the present disclosure provide a capability of tracking a status of an access request received from a host system (also referred to as a host request sometimes). The tracked status of each access request can further allow elimination and/or reduction of a gap latency in executing multiple access requests.

In embodiments described herein, access requests can be transparently managed (e.g., tracked) at a smaller granularity than that of the access request, such as using a respective set of sub-commands corresponding to each access request. For example, to process access requests, multiple sets of sub-commands can be generated and a respective status of each sub-command of the sets can be independently tracked until execution of the respective sub-command is completed. Each sub-command of an access request can involve performance of a different operation. Processing of the access requests using sub-commands provides a fine control of timings in executing multiple access requests.

In some embodiments, a memory system implemented with an access request management scheme can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (e.g., having the potential to, being able to), not in a mandatory sense (e.g., must). The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures may be identified by the use of similar digits. For example, 140 may reference element "40" in FIG. 1, and a similar element may be referenced as 240 in FIG. 2. A group or plurality of similar elements or components may generally be referred to herein with a single element number. For example, a plurality of reference elements 140-1 to 140-N may be referred to generally as 140. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a block diagram in the form of a computing system 100 including a host 102, a control component 104, and memory devices 140-1, . . . , 140-N in accordance with a number of embodiments of the present disclosure. In the embodiment illustrated in FIG. 1, the memory devices 140 can include one or more memory modules (e.g., single in-line memory modules, dual in-line memory modules, etc.). The memory devices 140 can include volatile memory and/or non-volatile memory. In a number of embodiments, the memory devices 140 can each include a multi-chip device. A multi-chip device can include a number of different memory types and/or memory modules. For example, a memory system can include non-volatile or volatile memory on any type of a module. As used herein, a host system 102, a control component 104, a central controller 106 (herein sometimes referred to as a first portion of the control component), channel data path components 108-1, . . . , 108-N (herein sometimes referred to as a second portion of the control component), and/or memory devices 140-1, . . . , 140-N might also be separately considered an "apparatus."

The host 102 can include host memory and a central processing unit (not illustrated). The host 102 can be a host system such as a personal laptop computer, a desktop computer, a digital camera, a smart phone, a memory card reader, and/or internet-of-thing enabled device, among various other types of hosts, and can include a memory access device (e.g., a processor and/or processing device). One of ordinary skill in the art will appreciate that "a processor" can intend one or more processors, such as a parallel processing system, a number of coprocessors, etc.

The host 102 can include a system motherboard and/or backplane and can include a number of processing resources (e.g., one or more processors, microprocessors, or some other type of controlling circuitry). The system 100 can include separate integrated circuits or the host 102, the central controller 106, and the memory devices 140 can be on the same integrated circuit. The system 100 can be, for instance, a server system and/or a high-performance computing (HPC) system and/or a portion thereof.

As illustrated in FIG. 1, a host 102 can be coupled to the control component 104 via an interface 103. The interface 103 can be any type of communication path, bus, or the like that allows for information to be transferred between the host 102 and the central component 106. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. However, in at least one embodiment, the interface 103 is a PCIe 5.0 interface that is compliant with the compute express link (CXL) protocol standard. Accordingly, in some embodiments, the interface 103 can include a flexible bus interconnect and use CXL protocol layers including CXL.io and CXL.mem and can support transfer speeds of at least 32 gigatransfers per second.

The memory device(s) 140, which can provide main memory for the computing system 100 or could be used as additional memory or storage throughout the computing system 100. The memory devices 140 can be various/different types of memory devices. For instance, the memory device can include RAM, ROM, DRAM, SDRAM, PCRAM, RRAM, and flash memory, among others. In embodiments in which the memory device 140 includes persistent or non-volatile memory, the memory device 140 can be flash memory devices such as NAND or NOR flash memory devices. Embodiments are not so limited, however, and the memory device 140 can include other non-volatile memory devices such as non-volatile random-access memory devices (e.g., non-volatile RAM (NVRAM), ReRAM, ferroelectric RAM (FeRAM), MRAM, PCRAM), "emerging" memory devices such as a ferroelectric RAM device that includes ferroelectric capacitors that can exhibit hysteresis characteristics, a memory device with resistive, phase-change, or similar memory cells, etc., or combinations thereof.

As an example, a FeRAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

As another example, an array of non-volatile memory cells, such as resistive, phase-change, or similar memory cells, can perform bit storage based on a change of bulk resistance, in conjunction with a stackable cross-gridded data access array. Additionally, in contrast to many flash-based memories, the non-volatile memory can perform a write in-place operation, where a non-volatile memory cell can be programmed without the non-volatile memory cell being previously erased.

In some embodiments, the computing system 100 can include eight memory devices (e.g., the memory devices 140) that are coupled to the control component 104 via eight different channels. The memory devices 140 can each comprise a number of dice that can be grouped into a number of ranks (e.g., four ranks) across the different channels. For example, a memory device 140 can be a quad-die package (QDP) with each die contributing to a different one of four ranks across the channels. In this example, if each die has a capacity of 2 Gibibytes (GiB), then the total capacity of the eight memory devices would be 64 GiB. However, embodiments of the present disclosure are not limited to a particular number of channels, ranks, memory devices, dice per memory device, dice per rank, or dice per channel.

The control component 104 can include central controller 106 and channel data path components 108. The central controller 106 can be a media controller such as a non-volatile memory express (NVMe) controller. The central controller 106 can control performance of a memory operation for an access request received from the host 102. The memory operation can be a memory operation to read data (in response to a read request from the host) from or an operation to write data (in response to a write request from the host) to memory devices 140.

As illustrated in FIG. 1, the channel data path components 108 couple the central controller 106 to the memory devices 140. Each channel data path component 108 can be coupled to the respective memory device 140 via a respective one of channels 105-1, . . . , 105-N and can assist communication of data and/or sub-commands between the central controller 106 and the respective memory device 140. Each data path component 108 can include a memory controller that is configured to perform operations such as copy, write, read, etc. on the respective memory device 140, for example, in response to receipt of sub-commands from the central component 106.

Further, in some embodiments, each data path component 108 can include error correction code (ECC) circuitry (e.g., ECC encoding/decoding circuitry) that is configured to perform an error recovery operation to correct/detect one or more errors on data stored in the respective memory device 140. As used herein, an error recovery operation that is performed at the data path component 108 can be referred to as an ECC operation. The ECC operation can be performed based on various types of ECC codes, such as Hamming codes, Reed-Solomon (RS) codes, Bose-Chaudhuri-Hochquenghem (BCH) codes, Cyclic Redundant Code (CRC), Golay codes, Reed-Muller codes, Goppa codes, and Denniston codes, among others.

In some embodiments, the channel data path component 108 can perform an error recovery operation on data stored in the respective memory device 140 (e.g., responsive to the data being uncorrectable via ECC, which can be referred to as an uncorrectable error). If the one or more errors on the data were not correctable (and/or the data were not recoverable) via the ECC circuitry of the channel data path component 108, the ECC circuitry can detect the uncorrectable error which can be communicated to the central controller 106.

The central controller 106 can perform an error recovery operation to correct one or more errors (on data stored in the respective memory device 140) that were not correctable at the respective channel data path component 108. The error recovery operation can be provided at the central controller 106 through a "Redundant Array of Independent Disks" (RAID) scheme, which can involve storing data (e.g., user data or host data) across a plurality of dice (e.g., different channels) as a number of "stripes" along with error recovery data (e.g., parity data) in one or more dedicated chips. As used herein, a stripe can refer to a set of host data and error recovery data that was generated based on the set of host data.

Accordingly, in such instances, user data stored on a damaged chip can be recovered by reading the user data from all of the chips contributing to the stripe along with the parity data. For example, the error recovery operation (to correct the errors on data stored in the "bad" memory device) can involve reading error recovery data (that has been previously generated at the central controller 106) and other data stored in the "good" memory devices 140 corresponding to the same stripe as the data stored in the "bad" memory device. An XOR of the other data read from the "good" memory devices 140 and the error recovery data can be used to recover (e.g., correct) the data read from the "bad" memory device 140. In some embodiments, the error recovery data can be parity data (e.g., RAID parity).

Host data (e.g., data received from the host 102) and error recovery data of a stripe (e.g., parity stripe) can be written to the memory devices 140 in various manners. For example, data corresponding to a single stripe can be distributed across multiple memory devices 140 such that an error recovery operation involves reading those memory devices 140 where the data are stored. In some embodiments, the memory devices 140 where data corresponds to the stripe are distributed across can be respectively coupled to different channels. Accordingly, in this example, reading the data corresponding to the stripe can involve accessing memory devices of multiple channels.

As used herein, data stored in each one of the memory devices 140 and corresponding to a particular stripe can be referred to as a "strip" of the particular stripe. Accordingly, in an example where data corresponding to a stripe are stored over and distributed across multiple memory devices (e.g., the memory devices 140), the stripe can include multiple strips that are distributed across the memory devices 140.

Error recovery data (e.g., RAID parity) can be stored in the memory devices 140-1, . . . , 140-N in various manners. As an example, the error recovery data can be stored in a single one of the memory devices 140 such that the memory device 140 configured for storing the error recovery data is not accessed until the error recovery operation is triggered at the central controller 106. For example, if the computing system 100 includes eight memory devices coupled to the control component 104 respectively via eight different channel, single one of eight memory devices can be configured to store the error recovery data and the other memory devices of seven channels can be configured to store host data (e.g., user data). In another example, the error recovery data can be dispersed into multiple portions that can be distributed among multiple memory devices of the memory devices 140. In some embodiments, 8 bytes of error recovery data can be written to the memory devices 140 for every 64 bytes of host data, which results in 56 GiB of host data with 8 GiB of error recovery data when a size of the memory devices is 64 GiB.

In some embodiments, host data/error recovery data can be accessed from a cache 107 of the central controller 106. By accessing at least a portion of the host data/error recovery data from the cache 107, latency and/or energy consumption that would have been incurred from accessing the host data/error recovery data entirely from the memory devices 140 can be eliminated/reduced.

The central controller 106 can further include special purpose circuitry and/or instructions for providing access request management by tracking respective status of sub-commands corresponding to access requests, which can allow efficient management/performance of the access requests. For example, once access requests are received at the central controller 106, the central controller 106 can generate a set of sub-commands corresponding to each access request and track a respective status of each sub-command that indicates a progress of execution of the respective sub-command. The respective status of each sub-command can be updated as the sub-command is being executed. When it is determined that all of the sub-commands corresponding to the access request are completely executed, the central controller 106 can generate/transmit a response corresponding to the access request back to the host 102.

The central controller 106 can further provide different data paths for access requests when the access requests involve performance of different types of operations. For example, the central controller 106 can process an access request that does not involve a trigger/performance of an error recovery operation (e.g., at the central controller 106) using a simplified data path (e.g., fast data path), while processing an access request involving the trigger/performance of the error recovery operation using a more sophisticated data path (e.g., slow data path). The different data paths (e.g., fast and slow) can be simultaneously utilized. For example, while an error recovery operation is being performed (e.g., at a recovery management component 230 and/or a parity component 232 illustrated in FIG. 2) for a first access request, the central controller 106 need not wait to initiate processing of a second access request until the completed processing of the first access request as long as the first access request does not involve performance of an error recovery operation. Rather, the central controller 106 can simultaneously process the second access request even while the error recovery operation is being performed for the first access request.

The embodiment of FIG. 1 can include additional circuitry that is not illustrated so as not to obscure embodiments of the present disclosure. It will be appreciated by those skilled in the art that the number of address input connections can depend on the density and architecture of the memory device 140.

Figure 2:
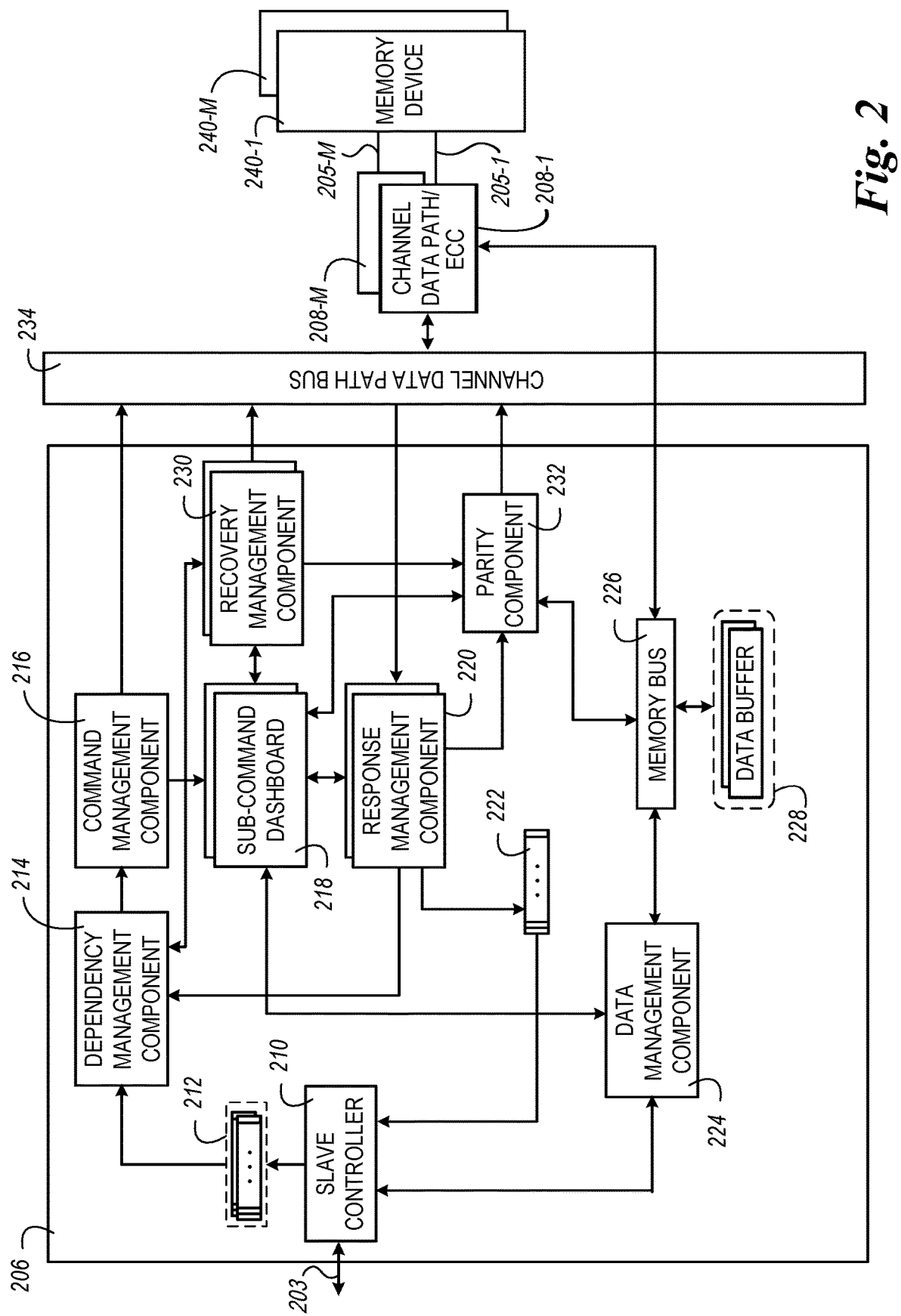
FIG. 2 is a block diagram in the form of a computing system including a control component, channel data path components, and memory devices in accordance with a number of embodiments of the present disclosure.

FIG. 2 is a block diagram in the form of a computing system 200 including a central controller 206, channel data path components 208-1, . . . , 208-M, and memory devices 240-1, . . . , 240-M in accordance with a number of embodiments of the present disclosure. The central controller 206, channel data path components 208, channels 205, and memory devices 240 can be respectively analogous to the central controller 106, channel data path components 108, channels 105, and memory devices 140 described in connection with FIG. 1. In a number of embodiments, the secondary (e.g., slave) controller 210 and/or each component (e.g., components 214, 216, 220, 230, 232, and/or 208) of the computing system 200 described in FIG. 2 can include special purpose circuitry in the form of an ASIC, FPGA, state machine, and/or other logic circuitry that can allow the components to orchestrate and/or perform respective operations described herein.

The secondary controller 210 can communicate with a host (e.g., the host 102 illustrated in FIG. 1) to exchange data, requests (e.g., access requests), and/or responses via an interface 203 (e.g., analogous to the interface 103 illustrated in FIG. 1). In some embodiments, the secondary controller 210 can operate in an active manner to retrieve an access request (along with data corresponding to a write request and to be written to the memory device 240) from the host (e.g., a host buffer) and insert the requests in (e.g., place into) a request queue 212. Further, a response to the access request can be transmitted to the host via the secondary controller 210. The response that can be communicated to the host can indicate whether the processing of the respective access request was successfully completed or not (e.g., a failure).

In some embodiments, the secondary controller 210 can determine whether to retrieve (e.g., accept) one of access requests enqueued in the host based on a capacity/availability of the request queue 212, a buffer 228, and/or memory devices 240. The secondary controller 210 can communicate with a data management component 224 to determine the capacity/availability of the buffer 228.

A dependency management component 214 can determine whether/when to retrieve one of access requests enqueued in the queue 212 and further provide the retrieved request to a command management component 216 to initiate processing of the access request. In some embodiments, the queue 212 can be a first-in, first-out (FIFO) buffer.

When an access request is retrieved from the queue 212 to the command management component 216, the command management component 216 can generate an entry including sub-commands corresponding to the request in the sub-command dashboard 218 and (e.g., simultaneously) issue the sub-commands to one or more of the channel data path components 208 through a data bus 234. As described herein, the data path component 208 can include a memory controller (not shown in FIG. 2) that can perform operations such as copy, write, read, etc. on the respective memory devices 240. The data path component 208 can further include (e.g., in the memory controller) address circuitry to latch address signals provided over I/O connections through I/O circuitry. Address signals can be received and decoded by a row decoder and a column decoder to access the memory device 240.

The command management component 216 can further generate an entry corresponding to an access request and store the entry in the dashboard 218. The entry can include a list of a respective set of sub-commands corresponding to each access request and respective statuses of the sub-commands. In some embodiments, the dashboard 218 can be a local memory including, for example, an array of SRAM memory cells.

Access requests can involve a different quantity and/or different types of sub-commands. In one example, an access request corresponding to a read request can include a sub-command to read data from one of the memory devices 240. In another example, an access request corresponding to a write request can include sub-commands of two phases. For example, a first phase of the write request can include a sub-command to read data stored in a location of the memory devices 240 (to which host data corresponding to the write request is to be written to) and a sub-command to read error recovery data corresponding to a same stripe as the data stored in the location. Further, a second phase of the write request can include a sub-command to write the host data to the location and a sub-command to write the updated error recovery data back to where it was read from. In some embodiments, the access request corresponding to the write request can further include a sub-command (in the first phase or the second phase) to update the error recovery data to conform to host data corresponding to the write quest.

A status of a sub-command can indicate whether execution of the sub-command is completed. In one example, a status of a sub-command to read data can be updated as completed when the data is successfully read without indication of one or more errors and/or one or more errors detected on the data are corrected by, for example, ECC component/circuitry in one of the (e.g., available) channel data path components 208. In another example, a status of a sub-command to write data can be updated as completed when the data has been transmitted to the respective channel data path component(s). Respective statuses of sub-commands in the dashboard 218 can be updated based on communication with and/or by a response management component 220, a recovery management component 230, the parity component 232, and/or the data management component 224.

In some embodiments, the dependency management component 214 can delay accepting an access request directed to (data corresponding to) a particular stripe if another request that has been previously accepted and being managed through the dashboard 218 and/or through the recovery management component 230 is also directed to the same stripe. Rather, the dependency management component 214 can put the request (that has not been accepted yet) into a dormant state (e.g., inactive state) until the access request being managed by the dashboard 218 and/or the recovery management component 230 is indicated as completed (e.g., a respective sub-response is received for each sub-command corresponding to the request). When processing of the access request (that has been managed by the dashboard 218 and/or the recovery management component 230) is indicated as completed, the response management component 220 can issue a wake-up command to the dependency management component 214 to reactivate the request that was put into the dormant state.

As sub-commands are issued to and executed at the channel data path components 208 and/or the memory devices 240, sub-responses corresponding to the respective sub-commands can be received at the response management component 220 from the respective channel data path components 208. A sub-response can indicate a result of the execution of a respective sub-command. For example, a sub-response can indicate whether data has been written to/read from the memory devices 240 and/or one or more errors on data stored in the memory devices 240. The response management component 220 can cause the dashboard 218 to update statuses of respective sub-commands based on indication of the received sub-responses.

As described in association with FIG. 1, each channel data path component 208 can include an ECC component (not illustrated in FIG. 2) that can perform an ECC operation (e.g., an error correction/detection operation) to correct/ detect one or more errors on data stored in the respective memory device 240. The channel data path components 208 can simultaneously perform error detection operations on data stored in different memory devices 240. When the one or more errors were not correctable using the ECC component of the channel data path component 208, the channel data path component 208 can transmit a sub-response indicating such to the response management component 220 via the channel data path bus 234.

The response management component 220 can further enable/cause the recovery management component 230 to initiate an error recovery operation in response to the received sub-response indicating one or more errors that were not correctable at the respective channel data path components 208 (e.g., in response to an uncorrectable error). In response to the sub-response, the response management component 220 can remove, from the dashboard 218, an entry having sub-commands associated with the error recovery operation and transfer the sub-commands to the recovery management component 230 such that the recovery management component 230 can initiate/perform the error recovery operation using the parity component 232. As described herein, in some embodiments, the response management component 220 can enable/cause the parity component 232 to update error recovery data stored in the memory devices 240 (e.g., as part of execution of a write request) without enabling the recovery management component 220.

Whenever a sub-response is received for a sub-command of an access request, the response management component 220 can update a status of the sub-command in the dashboard 218 When all sub-responses corresponding to the access request are received, the response management component 220 can generate a response corresponding to the access request and insert the response in a response queue 222, which further transmits the response to the host and release (e.g., remove) a respective entry in the dashboard 218. In some embodiments, the queue 222 can be a FIFO buffer.

Data associated with access requests can be transferred among the memory devices 240 and the host through a data path involving the secondary controller 210, data management component 224, memory bus 226, buffer 228, and channel data path component 208 (for read and/or write requests), and further parity component 232 and/or channel data path bus 234 (for write requests). The data management component 224 can store data associated with a read request (e.g., data retrieved from the memory devices 240) or with a write request (e.g., data received from the host via the secondary controller 210) that can be further transferred to the secondary controller 210 and/or the memory bus 226. The data management component 224 can further communicate with the dashboard 218 to determine physical location(s) (e.g., physical addresses) of the memory devices 240 to which data corresponding to a write request is to be written and/or from which data corresponding to a read request is to be retrieved.

The central controller 206 includes a memory bus 226 to transfer data among the data management component 224, buffer 228, and channel data path component 208. In some embodiments, the buffer 228 can include one or more arrays of SRAM memory cells. The memory bus 226 can be configured to allow concurrent (e.g., simultaneous) accesses by the data management component 224 to the memory devices 240.

In a non-limiting example, a read request is retrieved by the secondary controller 210 from a host (e.g., the host 102 illustrated in FIG. 1) and the read request can be put into the request queue 212. Once the read request is accepted by the dependency management component 214, the dependency management component 214 communicates the acceptance to the command management component 216 such that the command management component 216 generates/stores an entry with sub-commands corresponding to the read request in the dashboard 218. Further, the command management component 216 can issue the sub-command to the respective channel data path component 208. In response to the sub-command, data can be retrieved from the memory devices 240 to the respective channel data path component 208 as well as to the buffer 228. As described herein, each channel data path component 208 can transmit a sub-response to the response management component 220.

Continuing with the example, when the sub-response does not indicate one or more errors that were not correctable at the respective channel data path component 208, the response management component 220 can update a respective status of the sub-command in the dashboard 218. The response management component 220 can further generate/insert a response corresponding to the read request in the response queue 222 and remove the entry from the dashboard 218. The response can be further transmitted from the response queue 222 to the host via the secondary controller 210. Along with the response, the data corresponding to the read request and that has been stored in the buffer 228 can be transmitted/provided to the host as well.

When the sub-response indicates one or more errors on data retrieved from the memory device 240 is not correctable at the respective channel data path component 208, the response management component 220 can remove the entry having the sub-command from the dashboard 218 and transfer the sub-command to the recovery management component 230 to enable/cause the recovery management component 230 to initiate the error recovery operation using the parity component 232. For example, the recovery management component 230 can further enable/cause the parity component 230 to retrieve other data and error recovery data (corresponding to a same stripe as the data having the uncorrectable error(s) from one or more of the memory devices 240 and perform an error recovery operation to recover the data based on the other data and error recovery data (e.g., by XORing the other data and the error recovery data).

In a non-limiting example, when a write request (to write data to a particular location of the memory devices 240) is retrieved by the secondary controller 210 from a host (e.g., the host 102 illustrated in FIG. 1), the write request can be put into the request queue 212 and host data corresponding to the write request is transferred to the data management component 224, which can temporarily store the data in the buffer 228. Once the write request is accepted by the dependency management component 214, the dependency management component 214 communicates the acceptance to the command management component 216 such that the command management component 216 generates and stores an entry with sub-commands of a first phase of the write request in the dashboard 218. The sub-commands of the first phase of the write request can include a sub-command to read data stored in the particular location of the memory devices 240 and another sub-command to read error recovery data corresponding to the data stored in the particular location (e.g., corresponding to a same stripe as the data stored in the particular location).

The command management component 216 can simultaneously issue these sub-commands to the respective channel data path components 208. In response to the sub-commands, the data that has been stored in the particular location of the memory devices 240 as well as the error recovery data can be retrieved to the respective channel data path components 208. When the data and the error recovery data are retrieved, the response management component 220 can update respective statuses of the sub-commands as completed in the dashboard 218. The response management component 220 can further issue a sub-command to the parity component 232 to update the retrieved error recovery data based on the host data corresponding to the write request. For example, the response management component 220 and/or the parity component 232 can communicate with the respective channel data path components 208 to retrieve the data and the error recovery data from the memory devices 240 and the host data (corresponding to the write request) from the buffer 228 to update the error recovery data based on a comparison among those (e.g., by XORing the host data and error recovery data). Once the error recovery data is updated, the response management component 220 can update a statue of the sub-command as completed.

Once the error recovery data is updated, the response management component 220 can generate/store the other sub-commands corresponding to a second phase of the write request in the entry can be processed. The sub-commands of the second phase can include a sub-command to write data (received from the host along with the write request) to the particular location as well as another sub-command to write the updated error recovery data to the memory device 240. The sub-commands of the second phase can be generated at the time of the sub-commands of the first phase are generated or subsequent to respective statuses of the sub-commands of the first phase are indicated as completed. The response management component 220 can simultaneously issue these sub-commands to the channel data path component 208 corresponding to the particular location of the memory devices 240 and to the data management component 224 to cause the data management component 224 to write the host data that has been stored in the buffer 228 to the particular location. Further, the response management component 220 can further update the sub-commands of the second phase in the recovery management component 230 as completed and enqueue a response corresponding to the write request in the response queue 222 such that the response can be further transmitted to the host.

In a non-limiting example, an apparatus can include a group of memory devices (e.g., the memory devices 140/240 illustrated in FIGS. 1 and 2) and a controller (e.g., the central controller 106/206 illustrated in FIGS. 1 and 2) configured to manage the group of memory devices. The controller can be configured to receive an access request to access one or more memory devices of the group of memory devices. The controller can be further configured to issue a set of sub-commands corresponding to the access request to cause the set of sub-commands to be executed on one or more memory devices of the group. The controller can be further configured to transmit a response corresponding to the access request based at least in part on a status of one or more sub-commands of the set.

In some embodiments, the controller can be configured to receive a different access request and issue a set of sub-commands corresponding to the different access request to one or more memory devices of the group to cause the set of sub-commands corresponding to the different access request to be executed independently of the set of sub-commands corresponding to the access request. In this example, the controller can be configured to track respective statuses of the set of sub-commands corresponding to the different access request. The controller can be further configured to transmit, to a host (e.g., the host system 102 illustrated in FIG. 1), respective responses corresponding to the access requests in an order in which respective sub-responses corresponding to the set of sub-commands of the access request or the different access request are received and independently of an order in which the access requests were received at the controller. In some embodiments, the control component further includes an interface configured to receive the access request and operate according to a Compute Express Link (CXL) protocol.

In some embodiments, the controller can be a first portion of a control component (e.g., the control component 104 illustrated in FIG. 1) and the controller can be configured to simultaneously issue the set of sub-commands to a second portion (e.g., channel data path components 108/208 illustrated in FIGS. 1 and 2) of the control component to cause the second portion of the control component to execute the set of sub-commands on the one or more memory devices of the group. The controller can further include a request queue (e.g., the request queue 212 illustrated in FIG. 2) and the controller can be configured to receive and insert a plurality of access requests in the request queue prior to issuance of a respective one of the plurality of access requests to the second portion of the control component. In some embodiments, the request queue can be configured to operate according to a first-in, first-out (FIFO) policy.

In another non-limiting example, a system can include a group of memory devices (e.g., the memory devices 140/240 illustrated in FIGS. 1 and 2) and a controller (e.g., the central controller 106/206 illustrated in FIGS. 1 and 2) coupled to the group of memory devices. The controller can be configured to receive access requests including a first access request and a second access request to access one or more memory devices of the group. The controller can be further configured to simultaneously issue a first set of sub-commands corresponding to the first access request to cause the first set of sub-commands to be executed on a respective one of the group of memory devices. The controller can be further configured to simultaneously issue a second set of sub-commands corresponding to the second access request to cause the second set of sub-commands to be executed on a respective one of the group of memory devices, while the error recovery operation is being performed. The controller can be further configured to transmit a respective response corresponding to the first or the second access requests based at least in part on respective statuses of one or more sub-commands corresponding to the first or the second access request.

In some embodiments, the controller can be configured to transmit the respective response corresponding to the first or the second access request to a host (e.g., the host 102 illustrated in FIG. 1) in response to the respective status of each one of the first set or the second set of sub-commands received at the controller indicating completed execution of the first or second set of sub-commands. In some embodiments, the first and the second access requests can be enqueued in a host prior to being retrieved and received at the controller. In this example, the controller can be configured to determine whether to retrieve a respective one of the access requests enqueued in the host based on a capacity of a respective one of the group of memory devices or of the controller, or both.

In some embodiments, the first access request can correspond to a write request to write first data to a first location of the group of memory devices. The first set of sub-commands can include a sub-command to read second data stored in the first location of the group of memory devices. The first set of sub-commands can further include a sub-command to read error recovery data stored in a second location of the group of memory devices and corresponding to a same stripe as the second data. Further continuing with this example, the controller can be configured to update the error recovery data based at least in part on the first and the second data. The controller can be further configured to issue a sub-command to write the first data to the first location of the group of memory devices and a sub-command to write the updated error recovery data to the second location of the group of memory devices. In one example, the controller can be configured to generate the sub-command to write the first data and the sub-command to write the updated error recovery data simultaneously with generation of the first set of sub-commands. In another example, the controller can be configured to generate the sub-command to write the first data and the sub-command to write the updated error recovery data in response to the respective status of each one of the first set of sub-commands received at the controller indicating completed execution of the first set of sub-commands.

Figure 3:
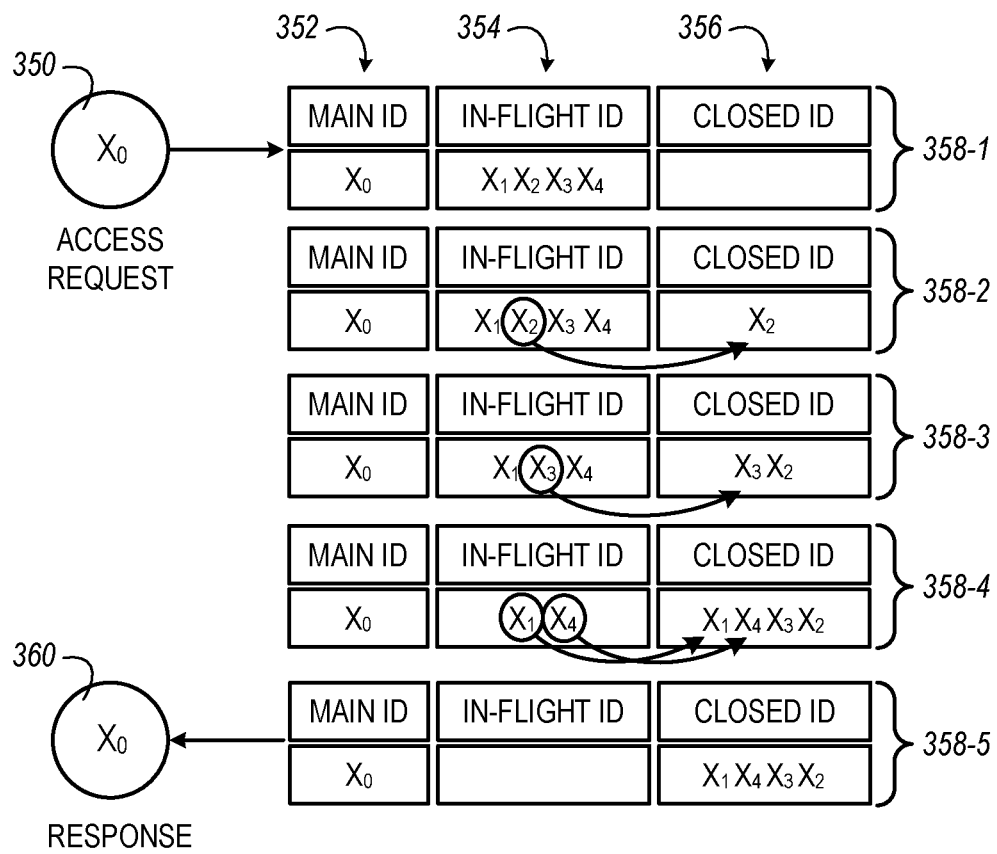
FIG. 3 illustrates respective status changes of sub-commands in a subcommand dashboard as the sub-commands are being executed in accordance with a number of embodiments of the present disclosure.

FIG. 3 illustrates respective status changes of sub-commands in a subcommand dashboard 318 as the sub-commands are being executed in accordance with a number of embodiments of the present disclosure. The dashboard 318 can be analogous to the dashboard 218 described in FIG. 2). Each access request and/or sub-command can be assigned an identifier to be distinctively identified. Column 352 ("Main ID") indicates an identifier of an access request received from a host (e.g., the host 102 illustrated in FIG. 1), column 354 ("In-Flight ID") indicates an identifier of an sub-command (corresponding to the access request) that is still being executed/yet to be executed (e.g., incomplete), and column 356 ("Closed ID") indicates an identifier of a sub-command that is already executed and completed.

At 358-1, in response to receipt of an access request 350, an entry indicating the access request 350 ($X_0$ as shown in column 352) and respective sub-commands corresponding to the access request 350 is generated and stored in the dashboard 318 ($X_1$, $X_2$, $X_3$, and $X_4$ as shown in column 354 at 358-1).

Subsequent to simultaneously issuing the generated sub-commands (e.g., to the channel data path components 108 and further to the memory devices 140 illustrated in FIG. 1), execution of the sub-commands can be completed in an unpredictable order. As illustrated in FIG. 3, at 358-2, execution of the sub-command $X_2$ is completed and a status of the sub-command $X_2$ is updated as completed; at 358-3, execution of the sub-command $X_3$ is completed and a status of the sub-command $X_3$ is updated as completed; and, at 358-4, execution of the sub-command $X_1$ and $X_4$ are completed and statuses of the sub-commands $X_1$ and $X_4$ are updated as completed. At 358-5, when all of the sub-response corresponding to the access request 350 are indicated as completed, a respective response 360 to the access request 350 can be transmitted back to a host (e.g., the host 102 illustrated in FIG. 1).

Figure 4:
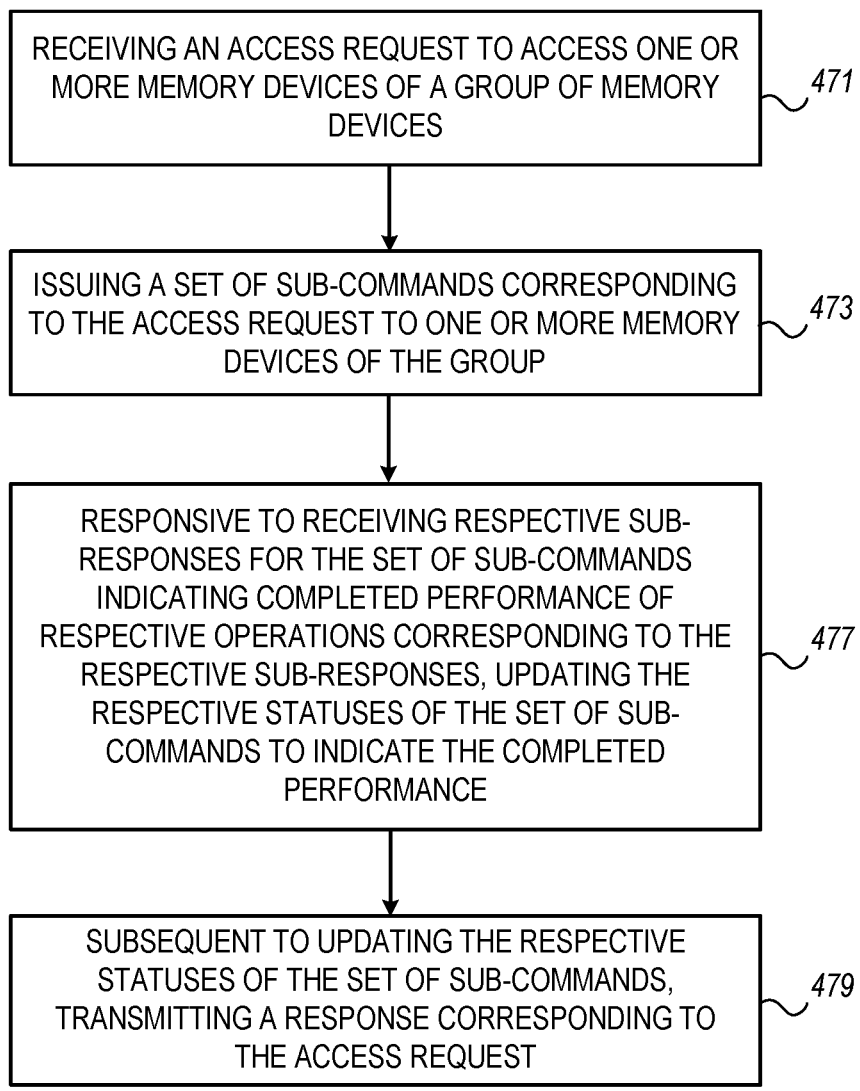
FIG. 4 is a flow diagram representing an example method for access request management using sub-commands in accordance with a number of embodiments of the present disclosure.

FIG. 4 is a flow diagram representing an example method 470 for data stripe protection in accordance with a number of embodiments of the present disclosure. The method 470 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 470 is performed by the control component 104 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 471, an access request to access one or more memory devices of a group of memory devices can be received (e.g., the memory devices 140 illustrated in FIG. 1). At block 473, a set of sub-commands corresponding to the access request can be issued to one or more memory devices of the group.

At block 477, the respective statuses of the set of sub-commands can be updated, responsive to receiving respective sub-responses for the set of sub-commands indicating completed performance of respective operations corresponding to the respective sub-responses, to indicate the completed performance. At block 479, a response corresponding to the access request can be transmitted (e.g., to the host 102 illustrated in FIG. 1) subsequent to updating the respective statuses of the set of sub-commands.

In some embodiments, the method 470 can further include, responsive to at least one of the respective sub-responses indicating one or more errors on data stored in the group of memory devices, performing an error recovery operation to recover the data stored in the group of memory devices. In this example, the method 470 can further include updating the respective statuses of the set of sub-commands to indicate the completed performance subsequent to performing the error recovery operation. The error recovery operation can be performed by reading, from each one of the group of memory devices, other data and error recovery data corresponding to a same stripe as the data and performing an XOR operation on the other data and the error recovery data to recover the data.

Figure 5:
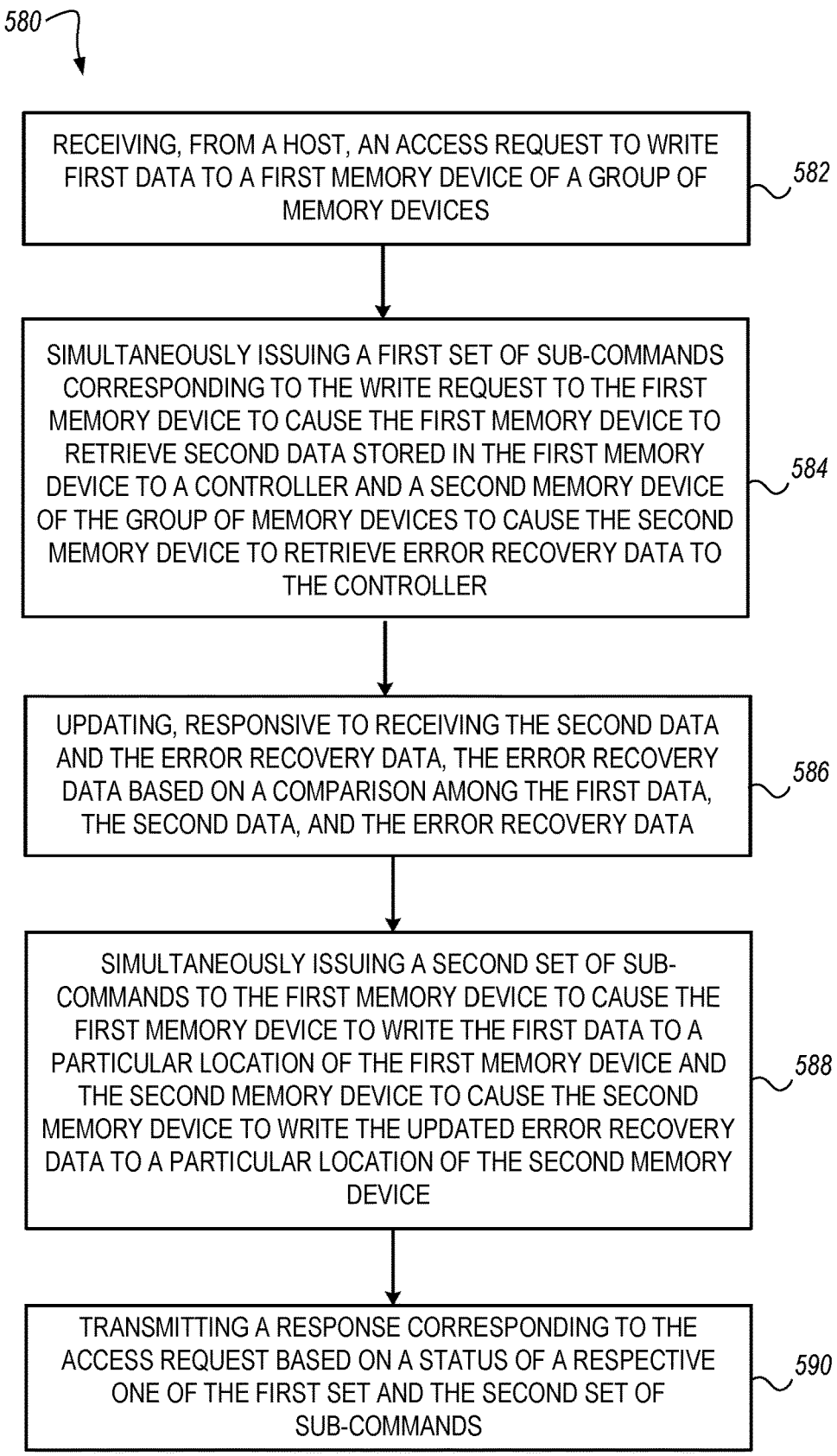
FIG. 5 is a flow diagram representing another example method for access request management using sub-commands in accordance with a number of embodiments of the present disclosure.

FIG. 5 is a flow diagram representing an example method 580 for data stripe protection in accordance with a number of embodiments of the present disclosure. The method 580 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 580 is performed by the control component 104 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 582, an access request to write first data to a first memory device of a group of memory devices (e.g., the memory devices 140 illustrated in FIG. 1) can be received from a host (e.g., the host 102 illustrated in FIG. 1). In some embodiments, the access request can be received via an interface of the controller that is configured to operate according to a compute express link (CXL) protocol. At block 584, a first set of sub-commands corresponding to the write request to can be simultaneously issued to the first memory device to cause the first memory device to retrieve second data stored in the first memory device to a controller (e.g., the controller 106 illustrated in FIG. 1) and a second memory device of the group of memory devices to cause the second memory device to retrieve error recovery data to the controller.

At block 586, responsive to receiving the second data and the error recovery data, the error recovery data can be updated based on a comparison among the first data, the second data, and the error recovery data. In some embodiments, the error recovery data can be updated by an XOR operation on the first data, the second data, or the error recovery data, or combination thereof. At block 588, a second set of sub-commands can be simultaneously issued to the first memory device to cause the first memory device to write the first data to a particular location of the first memory device and the second memory device to cause the second memory device to write the updated error recovery data to a particular location of the second memory device.

At block 590, a response corresponding to the access request can be transmitted based on a status of a respective one of the first set and the second set of sub-commands. In some embodiments, the respective statuses can be tracked based on a dashboard (e.g., the sub-command dashboard 218 illustrated in FIG. 2) that is configured to store a plurality of entries corresponding to respective sets of sub-commands including the first set of sub-commands or the second set of sub-commands. In some embodiments, a response indicating completed performance of the access request can be transmitted to the host responsive to receiving a respective sub-response corresponding to each one of the second set of sub-commands and indicating completed execution of each one of the second set of sub-commands.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. An apparatus, comprising:
a group of memory devices; and
a controller configured to manage the group of memory devices, the controller further configured to:
receive an access request to access one or more memory devices of the group of memory devices;

issue a set of sub-commands corresponding to the access request to cause the set of sub-commands to be executed on one or more memory devices of the group;

responsive to receiving respective sub-responses for the set of sub-commands indicating completed performance of respective operations corresponding to the respective sub-responses, updating respective statuses of the set of sub-commands to indicate the completed performance; and responsive to at least one of the respective sub-responses indicating one or more errors on data stored in the group of memory devices:

perform an error recovery operation to recover the data stored in the group of memory devices; and update the respective statuses of the set of sub-commands to indicate the completed performance subsequent to performing the error recovery operation;

subsequent to updating the respective statuses of the set of sub-commands, transmit a response corresponding to the access request based at least in part on a status of one or more sub-commands of the set.

2. The apparatus of claim 1, wherein the controller is configured to receive a different access request and issue a set of sub-commands corresponding to the different access request to one or more memory devices of the group to cause the set of sub-commands corresponding to the different access request to be executed independently of the set of sub-commands corresponding to the access request.

3. The apparatus of claim 2, wherein the controller is configured to:

track respective statuses of the set of sub-commands corresponding to the different access request; and transmit, to a host, respective responses corresponding to the access requests in an order in which respective sub-responses corresponding to the set of sub-commands of the access request or the different access request are received and independently of an order in which the access requests were received at the controller.

4. The apparatus of claim 1, wherein the controller is a first portion of a control component, the controller is configured to simultaneously issue the set of sub-commands to a second portion of the control component to cause the second portion of the control component to execute the set of sub-commands on the one or more memory devices of the group.

5. The apparatus of claim 4, wherein the controller further includes a request queue, and wherein the controller is configured to receive and enqueue a plurality of access requests in the request queue prior to issuance of a respective one of the plurality of access requests to the second portion of the control component.

6. The apparatus of claim 5, wherein request queue is configured to operate according to a first-in, first-out (FIFO) policy.

7. The apparatus of claim 4, wherein the control component further includes an interface configured to receive the access request and operate according to a Compute Express Link (CXL) protocol.

8. A system, comprising:
a group of memory devices; and
a controller configured to manage the group of memory devices, the controller configured to:

receive access requests including a first access request and a second access request to access one or more memory devices of the group;

simultaneously issue a first set of sub-commands corresponding to the first access request to cause the first set of sub-commands to be executed on a respective one of the group of memory devices;

simultaneously issue a second set of sub-commands corresponding to the second access request to cause the second set of sub-commands to be executed on a respective one of the group of memory devices, while an error recovery operation is being performed; and transmit a respective response corresponding to the first or the second access requests based at least in part on respective statuses of one or more sub-commands corresponding to the first or the second access request.

9. The system of claim 8, wherein the controller is configured to transmit the respective response corresponding to the first or the second access request to a host in response to the respective status of each one of the first set or the second set of sub-commands received at the controller indicating completed execution of the first or second set of sub-commands.

10. The system of claim 8, wherein:
the first and the second access requests are enqueued in a host prior to being retrieved and received at the controller; and
the controller is configured to determine whether to retrieve a respective one of the access requests enqueued in the host based on a capacity of a respective one of the group of memory devices or of the controller, or both.

11. The system of claim 8, wherein:
the first access request corresponds to a write request to write first data to a first location of the group of memory devices; and
the first set of sub-commands comprises:
a sub-command to read second data stored in the first location of the group of memory devices; and
a sub-command to read error recovery data stored in a second location of the group of memory devices and corresponding to a same stripe as the second data.

12. The system of claim 11, wherein the controller is configured to:
update the error recovery data based at least in part on the first and the second data;
issue a sub-command to write the first data to the first location of the group of memory devices; and
issue a sub-command to write the updated error recovery data to the second location of the group of memory devices.

13. The system of claim 12, wherein the controller is configured to generate the sub-command to write the first data and the sub-command to write the updated error recovery data simultaneously with generation of the first set of sub-commands.

14. The system of claim 12, wherein the controller is configured to generate the sub-command to write the first data and the sub-command to write the updated error recovery data in response to the respective status of each one of the first set of sub-commands received at the controller indicating completed execution of the first set of sub-commands.

15. A method, comprising:
receiving an access request to access one or more memory devices of a group of memory devices;
issuing a set of sub-commands corresponding to the access request to one or more memory devices of the group;
responsive to receiving respective sub-responses for the set of sub-commands indicating completed performance of respective operations corresponding to the respective sub-responses, updating respective statuses of the set of sub-commands to indicate the completed performance;
responsive to at least one of the respective sub-responses indicating one or more errors on data stored in the group of memory devices:
  performing an error recovery operation to recover the data stored in the group of memory devices; and
  updating the respective statuses of the set of sub-commands to indicate the completed performance subsequent to performing the error recovery operation; and
subsequent to updating the respective statuses of the set of sub-commands, transmitting a response corresponding to the access request.

16. The method of claim 15, wherein performing the error recovery operation to recover the data further comprises:
reading, from each one of the group of memory devices, other data and error recovery data corresponding to a same stripe as the data; and
performing an XOR operation on the other data and the error recovery data to recover the data.

17. A method, comprising:
receiving, from a host, an access request to write first data to a first memory device of a group of memory devices;
simultaneously issuing a first set of sub-commands corresponding to the write request to:
  the first memory device to cause the first memory device to retrieve second data stored in the first memory device to a controller; and
  a second memory device of the group of memory devices to cause the second memory device to retrieve error recovery data to the controller;
updating, responsive to receiving the second data and the error recovery data, the error recovery data based on a comparison among the first data, the second data, and the error recovery data;
simultaneously issuing a second set of sub-commands to:
  the first memory device to cause the first memory device to write the first data to a particular location of the first memory device; and
  the second memory device to cause the second memory device to write the updated error recovery data to a particular location of the second memory device; and
transmitting a response corresponding to the access request based on a status of a respective one of the first set and the second set of sub-commands.

18. The method of claim 17, further comprising receiving the access request via an interface of the controller that is configured to operate according to a compute express link (CXL) protocol.

19. The method of claim 17, further comprising transmitting, to the host, a response indicating completed performance of the access request responsive to receiving a respective sub-response corresponding to each one of the second set of sub-commands and indicating completed execution of each one of the second set of sub-commands.

20. The method of claim 17, further comprising tracking the respective statuses of the first set and the second set of sub-commands to determine when to transmit the response corresponding to the access request based on a dashboard configured to store a plurality of entries indicating a status of a respective one of the first set of sub-commands or the second set of sub-commands.

21. The method of claim 17, wherein updating the error recovery data based on the comparison among the first data, the second data, and the error recovery data comprises performing an XOR operation on the first data, the second data, or the error recovery data, or combination thereof.

* * * * *